Fig. 1A
THE INITIAL TEACHING ALPHABET

| Number | Character | Example | Traditional spelling |
|---|---|---|---|
| 1 | æ |ræt | rate |
| 2 | b | baull | ball |
| 3 | c | cat | cat |
| 4 | d | doll | doll |
| 5 | ee | meet | meet |
| 6 | f | fill | fill |
| 7 | g | gun | gun |
| 8 | h | hat | hat |
| 9 | ie | tie | tie |
| 10 | j | jelly | jelly |
| 11 | k | kit | kit |
| 12 | l | lamp | lamp |
| 13 | m | man | man |
| 14 | n | net | net |
| 15 | œ | tœ | toe |
| 16 | p | pen | pen |
| 17 | r | run | run |
| 18 | s | sell | sell |
| 19 | t | tap | tap |
| 20 | ue | nue | new |
| 21 | v | van | van |
| 22 | w | will | will |
| 23 | y | yell | yell |
| 24 | z | fizz | fizz |
| 25 | ʒ | houʒes | houses |
| 26 | wh | when | when |
| 27 | ch | chick | chick |
| 28 | th | thaut | thought |
| 29 | th | the | the |

Fig. 1B
THE INITIAL TEACHING ALPHABET

| Number | Character | Example | Traditional spelling |
|---|---|---|---|
| 30 | ʃh | ʃhip | ship |
| 31 | ʒ | meʒuer | measure |
| 32 | ŋ | siŋ | sing |
| 33 | a | far | far |
| 34 | au | autum | autumn |
| 35 | a | appl | apple |
| 36 | e | let | let |
| 37 | i | tin | tin |
| 38 | o | hot | hot |
| 39 | u | up | up |
| 40 | ω | bωk | book |
| 41 | ω | mωn | moon |
| 42 | ou | bou | bough |
| 43 | oi | toi | toy |
| 44 | r | first | first |

Oct. 29, 1968        I. J. PITMAN        3,407,515

METHOD OF AND MEANS FOR TEACHING PRONUNCIATION OF LANGUAGE

Filed April 11, 1966        4 Sheets-Sheet 3

*Fig. 2.*

THERE are FOUR ASPECTS of LEARNing a FOreign LANguage. FIRST of ALL, EveryONE WANTS to be Able to LIsten to it with UNderSTANDing and THEN be Able to SPEAK it and be UNderSTOOD. THEN, of COURSE, THEY WANT to be Able to READ it and ALSO to WRITE it.

*Fig. 3.*

THERE ARE FOUR ASPECTS OF LEARNING A FOREIGN LANGUAGE. FIRST OF ALL, EVERYONE WANTS TO BE ABLE TO LISTEN TO IT WITH UNDERSTANDING AND THEN BE ABLE TO SPEAK IT AND BE UNDERSTOOD. THEN, OF COURSE, THEY WANT TO BE ABLE TO READ IT AND ALSO TO WRITE IT.

*Fig. 4.* there are four aspects of learning a foreign language. first of all, everyone wants to be able to listen to it with understanding and then be able to speak it and be understood. then, of course, they want to be able to read it and also to write it.

Inventor
Jesse James Pitman,
by Pierce, Scheffler & Parker
his Attorneys

Fig. 5.

ther ar for aspects ov lerniŋ a foren laŋgwæj.
first ov aull, everywun wonts tω bee æbl tω
lisen tω it with understandiŋ and then bee æbl
tω speek it and bee understωd. then, ov cors,
thæ wont tω bee æbl tω reed it and aulsœ tω
riet it.

Fig. 6.

ther ar for aspects ov lerniŋ
a foren laŋgwæj. first ov
aull, everywun wonts tω bee æbl
tω lisen tω it with understandiŋ
and then bee æbl tω speek it and
bee understωd. then, ov cors,
thæ wont tω bee æbl tω reed it and
aulsœ tω riet it.

Fig. 7.

ther ar for aspects ov lerniŋ
a foren laŋgwæj. first ov aull,
everywun wonts tω bee æbl tω lisen
tω it with understandiŋ and then bee
æbl tω speek it and bee understωd.
then, ov cors, thæ wont tω bee æbl
tω reed it and aulsœ tω riet it.

United States Patent Office 3,407,515
Patented Oct. 29, 1968

3,407,515
METHOD OF AND MEANS FOR TEACHING
PRONUNCIATION OF LANGUAGE
Isaac James Pitman, 9 Southampton Place,
London, England
Filed Apr. 11, 1966, Ser. No. 541,507
Claims priority, application Great Britain, Apr. 14, 1965,
15,902/65
14 Claims. (Cl. 35—35)

ABSTRACT OF THE DISCLOSURE

Pronunciation of written words and the proper stressing and inflection of the spoken word are taught by presenting the words in lines of writing having a mean axis, and using relatively more visually significant characters for stressed syllables or words and relatively less visually significant characters for unstressed words or syllables, and indicating proper inflection by variation in the position of individual characters relative to said mean axis.

---

This invention relates to a new and improved method and equipment for demonstrating by visible means, the correct (or approximately correct) stressing, inflection and vowel duration of words and phrases in any alphabetically written language.

It should be appreciated from the outset that the invention is not directly concerned with the teaching of the language itself. By contrast, the basic object of the invention is to convey to a reader, or to an automatic reading device, information which otherwise would only normally be learnt through hearing the words or phrases spoken.

This invention will enable reading machines, such as those comprising combinations of electronic scanning devices and sound transmitters, to be programmed to read out loud from a text, using sounds which recognisably resemble human speech sounds, and giving a desired degree of stress, inflection and vowel duration.

In its broadest form the invention can be used with any existing alphabetic characters such for example as the Roman alphabet, the Greek alphabet, the German alphabet or the Cyrillic alphabet.

According to the present invention, there is provided a method for the visible presentation of words in alphabetic writing on any receptive surface in any spoken language for the purpose of demonstrating the stressing and inflection of the spoken word, which comprises using relatively more visually significant characters for stressed words or syllables and relatively less visually significant characters for unstressed words or syllables, and indicating inflection by varying the position of individual characters or groups of characters constituting a syllable, relative to the mean axis of the line of writing, according to the nature of the inflection required to be given to the spoken word.

In this specification, the following definitions will be used:

"Characters" shall include letters and symbols (whether conventional or wholly or partly novel) adapted to indicate consonant and vowel sounds, and complexes thereof such as diphthongs.

"Receptive Surface" shall mean any surface adapted for the permanent, temporary or evanescent positioning thereon of characters and, in addition to ordinary media for the reception of written and printed characters, shall include such surfaces as photographic cinematographic and television screens, and tapes and electronic tapes.

"Writing" shall mean the presentation of words by the application of characters to a receptive surface in such a manner that the characters can be detected and distinguished and shall include, for example, writing, printing, duplicating, embossing or indenting, photographic and electromagnetic reproduction and presentation.

"Alphabetic Writing" shall mean the presentation of words by the adjacent positioning of written characters in linear series.

"Inflection" shall mean modulation of the sound by raising or lowering its pitch on one or other side of the normal pitch for the sound concerned.

"Mean axis of a line of writing" shall denote a notional axial line which passes through the characters in series in the order in which they are written when spelling words, and which divides those characters into two halves straddling that line approximately equally on each side.

In a preferred form of the method, the character or group of characters constituting a syllable to be spoken with normal inflection is positioned to occupy a median position approximately equally straddling the mean axis of the line of writing; while the character or characters constituting a syllable to be spoken with relatively raised inflection is displaced to occupy a position towards one side of the said mean axis, and the character or characters constituting a syllable to be spoken with relatively lowered inflection is displaced to occupy a position towards the other side of the said mean axis.

In use for the English language and many others, the variation in position of individual characters or groups of characters constituting a syllable is also employed to indicate the duration of the vowel in such syllable.

When the method of this invention is applied to conventional written language, in which the mean axis of the line of writing runs from side to side of the receptive surface and the lines are scanned successively from top end to the bottom end of the receptive surface, the characters constituting syllables to be spoken with relatively raised inflection are preferably displaced from the median position in a direction towards the top end of the receptive surface, while, by contrast, characters constituting syllables to be spoken with relatively lowered inflection are displaced from the median position in a direction towards the bottom end of the receptive surface.

In order to indicate the relative difference in visual signficance between characters, the dimensions of the characters may be varied, or their boldness, or both. It is to be understood that when referring to characters as being relatively more or less bold, this may mean that the characters are either different in size or different in thickness, or both.

For simplicity, it is also preferred to use a consistent form of alphabet having no distinction in shape between upper and lower case symbols for any character.

Where a font in a single case is employed, capital letters may be indicated by increasing the size and/or boldness of the required character or characters beyond that used for stress indication.

Alternatively, upper and lower case characters of conventional form may be employed.

In most cases it is very advantageous for a systematic alphabetic relationship between characters and sounds to be employed for spelling, and moreover for the appearance of words and syllables so printed, to conserve a close similarity to those print-forms which are conventional in that alphabetic language.

The invention is particularly suitable for use in conjunction with the series of characters or symbols known, in the United Kingdom, as the "Initial Teaching Alphabet," examples of which are give in FIGS. 1A and 1B of the accompanying drawings.

The Initial Teaching Alphabet employs, in addition to characters which are identical with or closely similar to lower case symbols of the conventional Roman alphabet, a number of additional characters which are closely similar to existing print forms such as are used in the case of diphthongs or complex phonic letter combinations. It will thus be appreciated that if the present method is used in conjunction with the Initial Teaching Alphabet, the appearance of words and syllables so printed will conserve a notably close similarity to conventional print forms.

It has already been indicated that, for the purpose of simplifying the task of the reader, it may be desirable to utilise a font of type in which there is no distinction in shape between the upper and lower case symbol for any particular letter. This is one of the principles incorporated in the Initial Teaching Alphabet. Moreover, there already exists, in the principles of the Initial Teaching Alphabet, a systematic alphabetic relationship between characters and sounds which is employed for spelling.

It will be readily appreciated that the invention includes a teaching or demonstration device, for example a printed sheet or book, comprising an arrangement of printed matter in any alphabetic language, having the words or syllables presented in accordance with the method of this invention, in any one of its forms.

To explain the invention more clearly, it is convenient to set out a passage in English, first in ordinary conventional print form, and then in various ways which adopt the principles of the invention.

In the appended drawings FIG. 1A and FIG. 1B taken together set forth in the Initial Teaching Alphabet according to the present invention, using 44 characters for different sounds encountered in words.

FIGS. 2 and 3 show different modes of indicating relative stresses, and

FIGS. 4 to 7 inclusive show different modes of indicating inflection.

The selected passage reads as follows:

There are four aspects of learning a foreign language. First of all, everyone wants to be able to listen to it with understanding and then be able to speak it and be understood. Then, of course, they want to be able to read it and also to write it.

Referring now to the figures in the accompanying drawing:

FIGURE 2 is an example of the passage set out in accordance with the invention and utilising conventional Roman characters, wherein the relatively more visually significant characters are conventional upper case letters, and the relatively less visually significant characters are conventional lower case letters.

FIG. 3 is an example of the passage set out in accordance with the invention and utilising conventional Roman characters but in upper case only, wherein the relatively more visually significant characters are letters of larger size, and the relatively less visually significant characters are letters of smaller size.

FIG. 4 is an example of the passage set out in accordance with the invention and utilising conventional Roman characters, but in lower case only, wherein the relatively more visually significant characters are letters of larger size, and the relatively less visually significant characters are letters of smaller size.

FIG. 5 is an example of the passage set out using the Initial Teaching Alphabet, but without incorporating the principles of this invention, and FIG. 6 is an example of the passage set out using the Initial Teaching Alphabet and in accordance with the invention, wherein the letters or symbols are all in a single case, the more visually significant characters being of larger size and the less visually significant characters being of smaller size.

FIG. 7 shows the preferred way of carrying out this invention and is set in two basic type sizes. The exact point sizes are not particularly significant. What is important is that the smaller characters are approximately ⅔ the size of the larger characters. (There are 72 points in an inch. However, point size is an indication of the vertical height required to print every character, not necessarily of the vertical height of any one printed character; that is, an amateur cannot measure a character as printed and be sure that it is a definite point size.)

The use of a standard basic relationship between the two type sizes enables variations in stress to be indicated more precisely. In line one "ꜯhær" and "for" are both of the same larger size. However, "ꜯhær" appears in what is called "standard type," and "for" in what is called "semibold." The words printed in semibold type, like the word "for," receive the strongest stress of all. The words printed in the large standard type, like the word "ꜯhær," receive secondary stress.

The unstressed syllables or characters all appear in the smaller size type in standard weight. If they appear flush with the top of the "x" line, as in "iŋ" (the last syllable of the word "leɾniŋ" in the first line), they take the sound of "i" in the word "it." If they appear flush with the bottom of the "x" line, as in the word "aɾ," they take the sound of "uh." The "x" line simply refers to the vertical space occupied by the printed portion of the lower case letter "x"—if it existed in The Initial Teaching Alphabet—in the larger size type. Also, when we state that the smaller characters appear flush with the bottom or top of the x line, we are referring to characters of the same vertical height as "x."

TABLE 1.—THE INITIAL TEACHING ALPHABET

| Number | Character | Example | Traditional spelling |
|---|---|---|---|
| 1 | æ |ræt | rate |
| 2 | b | ball | ball |
| 3 | c | cat | cat |
| 4 | d | doll | doll |
| 5 | ee | meet | meet |
| 6 | f | fill | fill |
| 7 | g | gun | gun |
| 8 | h | hat | hat |
| 9 | ie | tie | tie |
| 10 | j | jelly | jelly |
| 11 | k | kit | kit |
| 12 | l | lamp | lamp |
| 13 | m | man | man |
| 14 | n | net | net |
| 15 | œ | toe | toe |
| 16 | p | pen | pen |
| 17 | r | run | run |
| 18 | s | sell | sell |
| 19 | t | tap | tap |
| 20 | ue | nue | new |
| 21 | v | van | van |
| 22 | w | will | will |
| 23 | y | yell | yell |
| 24 | z | fizz | fizz |
| 25 | ʒ | houses | houses |
| 26 | wh | when | when |
| 27 | ch | chick | chick |
| 28 | th | thaut | thought |
| 29 | th | the | the |
| 30 | sh | ship | ship |
| 31 | 3 | mezuer | measure |
| 32 | ŋ | sing | sing |
| 33 | a | far | far |
| 34 | au | autum | autumn |
| 35 | a | appl | apple |
| 36 | e | let | let |
| 37 | i | tin | tin |
| 38 | o | hot | hot |
| 39 | u | up | up |
| 40 | ω | bωk | book |
| 41 | ω | mωn | moon |
| 42 | ou | bou | bough |
| 43 | oi | toi | toy |
| 44 | r | first | first |

Table 2.

THERE are FOUR ASPECTS of LEARNING a FOreign LANguage. FIRST of ALL, EveryONE WANTS to be Able to LIsten to it with UNderSTANDing and THEN be Able to SPEAK it and be UNderSTOOD. THEN, of COURSE, THEY WANT to be Able to READ it and ALSO to WRITE it.

Table 3.

THERE ARE FOUR ASPECTS OF LEARNING A FOREIGN LANGUAGE. FIRST OF ALL, EVERYONE WANTS TO BE ABLE TO LISTEN TO IT WITH UNDERSTANDING AND THEN BE ABLE TO SPEAK IT AND BE UNDERSTOOD. THEN, OF COURSE, THEY WANT TO BE ABLE TO READ IT AND ALSO TO WRITE IT.

Table 4.

there are four aspects of learning a fOreign language. first of all, everyone wants to be able to listen to it with understanding and then be able to speak it and be understood. then, of course, they want to be able to read it and also to write it.

Table 5.

first ov all, everywun wonts tω bee æbl tω lisen tω it wið understandiŋ and then bee æbl. tω spæk it and bee understωd. ðen, ov cors, ðæ wont tω bee æbl tω ræd it and also tω ræt it.

Table 6.

ᵺær ar for aspects ov lerniŋ
a fOren laŋgwəj. first ov
aull, everywun wonts tω bee æbl
tω lisen tω it wiᵺ understandiŋ
and ᵺen bee æbl tω speek it and
bee understωd. ᵺen, ov cors,
ᵺæ wont tω bee æbl tω reed it and
aulsœ tω riet it.

Table 7.

ᵺær ar for aspects ov lernig
a foren laŋgwæj. first ov aull,
everywun wonts tω bee æbl tω lisen
tω it wiᵺ understandiŋ and ᵺen bee
æbl tω speek it and bee understωd.
ᵺen, ov cors, ᵺæ wont tω bee æbl
tω reed it and aulsœ tω riet it.

What I claim is:

1. A method for the visible presentation of words in alphabetic writing on any receptive surface in any spoken language for the purpose of demonstrating the stressing and inflection of the spoken word, the words being presented in lines of writing which have a mean axis, which comprises using relatively more visually significant characters for stressed words or syllables and relatively less visually significant characters for unstressed words or syllables, and indicating inflection by varying the position of individual characters or groups of characters constituting a syllable, relative to the mean axis of the line of writing, the character or group of characters constituting a syllable to be spoken with normal inflection being positioned to occupy a median position approximately equally straddling the mean axis of the line of writing; while the character or characters constituting a syllable to be spoken with relatively raised inflection being displaced to occupy a position towards one side of the said means axis, and the character or characters constituting a syllable to be spoken with relatively lowered inflection being displaced to occupy a position towards the other side of the said means axis.

2. A method as claimed in claim 1, wherein the variation in position of individual characters or groups of characters constituting a syllable is also employed to indicate the duration of the vowel in such syllable.

3. A method of claimed in claim 1, when applied to conventional written language, in which the mean axis of the line of writing runs from side to side of the receptive surface and the lines are scanned successively from top end to the bottom end of the receptive surface, and in which characters constituting syllables to be spoken with relatively raised inflection are displaced from the median position in a direction towards the top end of the receptive surface, while characters constituting syllables to be spoken with relatively lowered inflection are displaced from the median position in a direction towards the bottom end of the receptive surface.

4. A method as claimed in claim 1, in which the relative difference in visual significance between characters is indicated by varying the dimensions of the characters.

5. A method as claimed in claim 4, wherein a consistent form of alphabet is employed, having no distinction in shape between upper and lower case symbols for any character.

6. A method as claimed in claim 4, in which the relative difference in visual significance between characters is indicated by varying the boldness of the characters.

7. A method as claimed in claim 4, in which upper and lower case characters of conventional form are employed.

8. A method as claimed in claim 1, wherein a systematic alphabetic relationship between characters and sounds is employed for spelling.

9. A method as claimed in claim 8, in which the appearance of words and syllables so printed conserves a close similarity to those print-forms which are conventional in the alphabetic language.

10. A method as claimed in claim 7, in which any conventional alphabet is employed and the presentation of words is otherwise substantially in accordance with the example set out in FIG. 2 of the accompanying drawing.

11. A method as claimed in claim 6, in which any conventional alphabet is employed and the characters are written in the appropriate upper case form only, the presentation of words being otherwise substantially in accordance with the example set out in FIG. 3 of the accompanying drawing.

12. A method as claimed in claim 6, in which any conventional alphabet is employed and the characters are written in the appropriate lower case form only, the presentation of words being otherwise substantially in accordance with the example set out in FIG. 4 of the accompanying drawing.

13. A method as claimed in claim 9, wherein the characters of the initial teaching alphabet are employed and the presentation of words is substantially in accordance with the example set out in FIG. 6.

14. A method as claimed in claim 9, wherein the characters of the initial teaching alphabet are employed and the presentation of words is substantially in accordance with the example set out in FIG. 7.

References Cited

UNITED STATES PATENTS 78,296   5/1868   Leigh _____ 283—46

EUGENE R. CAPOZIO, *Primary Examiner.*

W. H. GRIEB, *Assistant Examiner.*